US012355155B1

(12) United States Patent
Birnbach

(10) Patent No.: US 12,355,155 B1
(45) Date of Patent: Jul. 8, 2025

(54) LONG-RANGE FRACTAL-BASED DEFENSE SYSTEM

(71) Applicant: Advanced Fusion Systems LLC, Newtown, CT (US)

(72) Inventor: Curtis A. Birnbach, New Rochelle, NY (US)

(73) Assignee: Advanced Fusion Systems LLC, Newtown, CT (US)

( * ) Notice: Subject to any disclaimer, the term of this patent is extended or adjusted under 35 U.S.C. 154(b) by 0 days.

(21) Appl. No.: 18/628,493

(22) Filed: Apr. 5, 2024

(51) Int. Cl.
*H01Q 15/00* (2006.01)
*H01Q 1/22* (2006.01)
*H01Q 1/50* (2006.01)
*H01Q 3/26* (2006.01)

(52) U.S. Cl.
CPC ........... *H01Q 15/0093* (2013.01); *H01Q 1/22* (2013.01); *H01Q 1/50* (2013.01); *H01Q 3/2664* (2013.01); *H01Q 15/00* (2013.01)

(58) Field of Classification Search
CPC ........ H01Q 15/0093; H01Q 1/22; H01Q 1/50; H01Q 3/2664; H01Q 15/00
See application file for complete search history.

(56) References Cited

U.S. PATENT DOCUMENTS

| | | | | |
|---|---|---|---|---|
| 11,652,281 B1 | | 5/2023 | Birnbach | |
| 2003/0151556 A1* | | 8/2003 | Cohen | H01Q 5/371 343/702 |
| 2012/0112953 A1* | | 5/2012 | Grau Besoli | G01S 13/87 342/146 |
| 2021/0218382 A1* | | 7/2021 | Hickle | H03H 7/0153 |

OTHER PUBLICATIONS

1 Benoit B. Mandelbrot, "Fractals and the Geometry of Nature", W.H. Freeman, Aug. 1982, 14 pages.

* cited by examiner

*Primary Examiner* — Hai V Tran
(74) *Attorney, Agent, or Firm* — Leason Ellis LLP

(57) ABSTRACT

A fractal-antenna based system with radar-like detection and communication comprises a fractal antenna array that transmits and receives EM radiation ranging from high frequency (HF) to ultralow frequency (ULF), a phase shifter coupled to the fractal antenna array, a pulse generator coupled to the phase shifter, and a host computer coupled to the phase shifter and the pulse generator. The host computer is configured to: i) control the pulse generator to craft a transmitted wave of selected shape in the time domain, with the ability to enable active defensive measures or detection-only modes, ii) control the phase shifter and antenna to cause radiation to sweep across a coverage radius of at least 5 kilometers, iii) analyze signals received by the fractal antenna array to detect the location and speed of reflective objects in the coverage area, and activate countermeasures based on the location and speed of a detected reflective object.

61 Claims, 11 Drawing Sheets

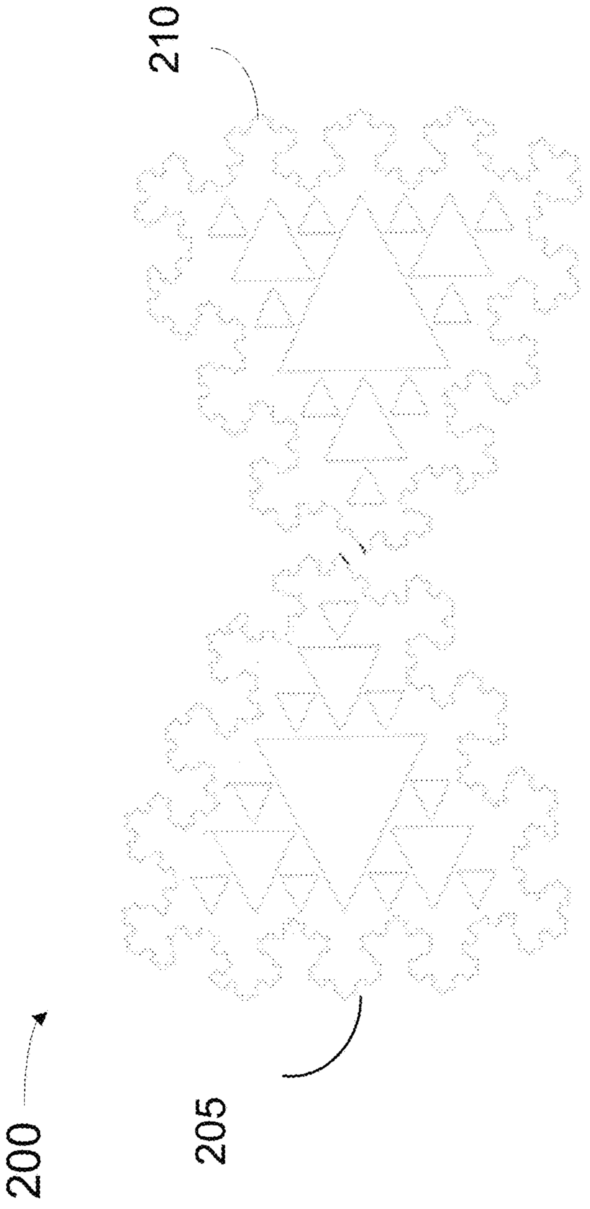
FIG.2
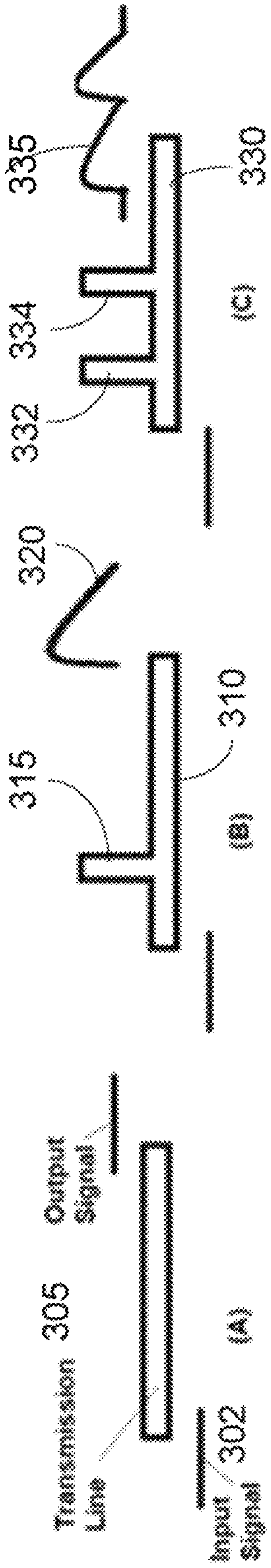
FIG.3A
FIG. 3B
FIG. 3C

LONG-RANGE FRACTAL-BASED DEFENSE SYSTEM

FIELD OF THE INVENTION

The present disclosure relates to long range detection using low frequency radiation for defensive, offensive, and detection systems, and in particular relates to using fractal antennae and other specialized systems as a queueing means for long range detection of a wide variety of threats that can be land-based, aerial, underwater, or space-based in nature, and as a means to neutralize threats.

Definitions

Beam Stacking: As utilized herein, beam stacking refers to positioning of a plurality of beams of electromagnetic energy on a single point, said beams being phase coherent such that they combine and add in strength via interferometric means.

Beamforming: Beamforming is the application of multiple radiating elements transmitting the same signal at an identical wavelength but with differential phase, which combine to create the effect of a single radiated beam with a more targeted stream which is formed by reinforcing the waves in specific directions. If the relative phases are varied, the angle of radiation varies as well. (See also "Phased Array" and "Timed Array").

Beam steering: Beam steering is achieved by adjusting the relative phase of the input signals to all radiating elements. Phase shifting allows the signal to be targeted at a specific target. An antenna can employ radiating elements operating on a common frequency to steer a single beam in a specific direction. Different frequency beams can also be steered in different directions to serve different users. The direction in which a signal is sent can be calculated dynamically by the base station as the endpoint moves, effectively tracking the user. (See also "Phased Array" and "Timed Array").

C3ISR: Military abbreviation for "command, control, communications, intelligence, surveillance and reconnaissance" operations Component Elements: In this document, the term "element" is used to describe a major electrical section of an antenna, typically where a structure of the antenna is repeated in some form or scale.

Crafted Wave Technology: A method of shaping the pulse waveform so that the desired Radio Frequency-Induced Transparency (RFIT) (defined below) can be produced and delivered energy requirements can be met.

EM: Term of art abbreviation for "Electromagnetic"

Faraday Shield: a fully conductive enclosure used to block electromagnetic fields from reaching a shielded object within it.

Far-Field: The far-field is a region of the electromagnetic (EM) field around an antenna, located at a distance from the antenna, said distance being a function of the frequency of the signal being radiated. Far-field behaviors predominate at greater distances. (See also: "Near Field").

Fractal: A geometric pattern based on mathematics first clearly espoused by Benoit Mandelbrot in his work, "The fractal geometry of nature." Mandelbrot, Benoît B. (1983). (Macmillan. ISBN 978-0-7167-1186-5). Fractals have been described as: "A rough or fragmented geometric shape that can be split into parts, each of which is (approximately) a reduced-size copy of the whole".

Fractal Antenna: An electromagnetic antenna whose physical shape is determined by a fractal mathematical equation. Embodiments of a fractal antenna are described in commonly-owned and assigned U.S. Pat. No. 11,652,281 entitled "Compact Covert Fractal Antenna" ('281 patent). The '281 patent is incorporated by reference herein in its entirety for any purpose.

Frequency Band Descriptions: For the purposes of this document, the ITU designation for radio frequencies (RF), the following definitions apply:

i. HF: High Frequency: Frequencies between 3 MHz and 30 MHZ ii. MF: Medium Frequency: Frequencies between 300 KHz and 3 MHz iii. LF: Low Frequency. Frequencies between 30 KHz and 300 KHz iv. VLF: Very Low Frequency: Frequencies between 3-30 kHz, corresponding to wavelengths from 100 to 10 km, respectively. VLF waves have very low path attenuation, 2-3 dB per 1,000 km with little of the "fading" experienced at higher frequencies. This is because VLF waves are reflected from the bottom of the ionosphere, while higher frequency shortwave signals are returned to Earth from higher layers in the ionosphere, the F1 and F2 layers, by a reflection process, and spend most of their journey in the ionosphere, so they are much more affected by ionization gradients and turbulence. Therefore, VLF transmissions are very stable and reliable, and are used for long-distance communication, albeit somewhat limited in bandwidth due to the low frequency.

V. ULF: Ultra Low Frequency: Frequencies between 300 hertz and 3 kilohertz.

Frequency Domain: Frequency domain refers to the analysis of mathematical functions or signals with respect to frequency, rather than time, as in a time series.

FWHM: Term of art abbreviation for "Full Width Half Maximum", an engineering standard term used to describe how long a pulse lasts for. The measurement is made from a point half way up the leading edge of the signal to a point halfway down the trailing edge of a signal.

Hardness: As used herein, "hardness" refers specifically to the amount and type of electromagnetic shielding provided for a given target.

Interchangeability of Time and Frequency domains: The intrinsic relationship between the time and frequency domain is described by the Fourier Transform which defines how signals in one of these domains appear when converted to the other domain.

Kph: Maritime measure of speed; Knots per Hour. One Mile per hour is equal to 1.6 Kph Near-Field: The near-field is a region of the electromagnetic (EM) field starting directly adjacent to an antenna, or the result of radiation scattering off an object. Non-radiative near-field behaviors dominate close to the antenna or scatterer. The depth of the near-field is a function of the radiated frequency as is the case with the far-field.

Phased Array: Phased arrays are a class of antennae comprised of a group of antenna elements located at distinct spatial locations in which the relative phases of the antenna signals are varied in such a way that the effective propagation pattern of the array is reinforced in a desired direction and suppressed in undesired directions.

Platform: In military parlance, any vehicle, vessel, aircraft, spacecraft, or other location where equipment may be installed.

RF: Technical abbreviation for Radio Frequency

RF-induced Transparency (RFIT): An electromagnetic phenomenon which provides a means of overcoming Faraday shielding of the target when the system is used in an active defensive or offensive modes. This is implemented in the VLF band instead of in the optical band where prior experimentation has occurred.

SIGINT: Military abbreviation for "Signals Intelligence". SIGINT refers to the gathering of various forms of electromagnetic emissions and the analysis thereof.

Timed Array: A Timed Array is the Time Domain equivalent of a phased array. It refers to a grouping of antennae elements operated simultaneously and cooperatively, and fed by signals of varying phase in the Time Domain.

Time Domain: Time domain refers to the analysis of mathematical functions, physical signals or time series of economic or environmental data, with respect to time. In the time domain, the signal or function's value is known for being all real numbers, for the case of continuous time, or at various separate instants in the case of discrete time.

VLF Radar: A topic of the present disclosure; refers to operation of radio based ranging systems in the VLF portion of the EM spectrum.

Waterfall Display: A digital data display technique that present the results of a time-frequency analysis. It is a plot of the time domain data against the frequency domain data and is a well-known method of displaying complex data such as sonar signals.

BACKGROUND

There are a number of threats from a wide variety of armaments for which current countermeasures are thought to be insufficient for complete security. One area of particular concern to the military is the plethora of aerial/space threats that have emerged. These include (but are not limited to) missiles, drones, aircraft, and rockets. Many of these threats now move at extremely high velocities, including a whole class of hypersonic missiles which can travel at speeds of thousands of miles per hour. Due to the high velocities of some of these threats, adequate detection needs to occur at considerable distances, including but not limited to, 5 to 100 kilometers. Preferably, complete security also requires a means of destroying, disabling, or otherwise defeating the threats at such long distances. Given the speeds involved, such security systems require electronic steering or direction as mechanical steering would be too slow to effectively deal with individual threats, let alone multiple simultaneous threats.

Another major area of concern are underwater threats. Underwater threats such as torpedoes also present huge practical defensive challenges. Since their introduction into maritime warfare, torpedoes and more recently, other mobile underwater platforms, generally known as UUV's (unmanned underwater vehicles) have presented the biggest and hardest to defeat threat to ships and shipping. Even the largest ships of the line (aircraft carriers and other ships of that size class) are highly vulnerable to attack by torpedoes. Perhaps the biggest challenge to designing effective maritime defenses is the lack of long range means of detection. Prior attempts to use radio frequency detection have generally failed because radio frequencies typically do not propagate over any significant distance underwater. Sonar is currently the only technology that offers any useful amount of range, but even that range is relatively short and it has other significant limitations. Another problem with sonar it that it is generally resource-intensive to interpret sonar signals of small, noisy and fast-moving objects such as torpedoes. In addition, as active sonar gives away one's own position, passive sonar is the best option for defense, yet it is only useful at speeds of about 20 kph or less (due to noise generated by the motion of the ship and its propulsion system). Sonar therefore only provides limited information on target distance unless triangulation is employed, which requires more data points, further calculations, and additional time. A standard Mark 48 torpedo travels at around 80 kph and has an effective range of about 40 km. This makes the window for detecting an incoming torpedo, launching a counter-torpedo type device, and having the time for it to travel to and accurately hit the moving target, too short for adequate defense. Conventional radar systems also do not work underwater as water does not transmit RF due to its conductivity. While there is a great deal of research going on in this area, to date, no viable solution has been brought to the fore.

There remains a compelling need for a protective system that can address a wide variety of current and projected scope of threats to armed forces, military and civilian bases, in various environments including air, sea, and space.

SUMMARY OF THE DISCLOSURE

In a first aspect the present disclosure provides a fractal-antenna based system with radar-like detection and communication capabilities for providing offensive, defensive and detection capabilities. The system comprises a fractal antenna array adapted to transmit and receive EM radiation in a range from high frequency (HF) to ultralow frequency (ULF), a phase shifter coupled to the fractal antenna array, a pulse generator coupled to the phase shifter, and a host computer coupled to the phase shifter and the pulse generator. The host computer is configured to: i) control the pulse generator to craft a transmitted wave of selected shape in the time domain which produces a selected spectrum in a frequency domain, wherein an output energy of the pulse generator is set so as to enable active defensive measures or detection only modes; ii) control the phase shifter to cause radiation emitted from the fractal antenna array to sweep across a coverage radius of at least 5 kilometers, iii) analyze signals received by the fractal antenna array to detect electromagnetically a location and speed of reflective objects present in the coverage area, and activate countermeasures based on the location and speed of a detected reflective object, wherein the reflective object is determined to be a potential threat.

In another aspect, the present disclosure provides a fractal-antenna based active defensive system communication for providing offensive, defensive and detection capabilities. The system comprises a) a fractal antenna array adapted to transmit and receive EM radiation in a range from high frequency (HF) to ultralow frequency (ULF); b) a phase shifter coupled to the fractal antenna array; c) a pulse generator coupled to the phase shifter; d) a larger capacitor bank coupled to the pulse generator operative to increase an energy and repetition rate of pulses provided for transmission by the fractal antenna; and e) a host computer coupled to the phase shifter and the pulse generator. The host computer is configured to: i) control the pulse generator to craft a transmitted wave of selected shape in a time domain which produces a selected spectrum in a frequency domain, ii) control the phase shifter to cause radiation emitted from the fractal antenna array to sweep across a coverage radius of at least 5 kilometers, iii) analyze signals received by the fractal antenna array to detect electromagnetically reflective objects present in the coverage area to determine a location and speed of the reflective objects, and iv) activate the capacitor bank, pulse generator, phase-shifter to transmit a crafted wave via the fractal antenna array toward a target which is at least one of the reflective objects detected, wherein the transmitted wave is crafted to disrupt the target so as to annul any threat presented by the target.

In certain implementations, the fractal-antenna based system further includes at least one additional pulse generator coupled to the phase shifter; and at least one additional capacitor bank coupled to the at least one additional pulse generator. The additional elements enable the system to transmit multiple beams simultaneously via the pulse generator and the at least one additional pulse generator as controlled by the host computer.

In still another aspect of the present disclosure provides a fractal-antenna based protective system for an area that comprises a) a plurality of fractal antenna arrays adapted to transmit and receive EM radiation in a range from high frequency (HF) to ultralow frequency (ULF), each of the plurality of fractal antenna arrays positioned at a location within a radius of a central location; b) a plurality of phase shifters, each of the plurality of phase shifters coupled to one of the plurality of fractal antenna arrays; c) a plurality of pulse generators, one or more of the plurality of pulse generators being coupled to one of the plurality of phase shifters; d) a plurality of capacitor banks, each of the plurality of capacitor banks coupled one of the plurality of pulse generators and being operative to increase an energy and repetition rate of pulses provided for transmission by the fractal antenna; and e) a single host computer coupled to each of the plurality of pulse generators and phase shifters. The host computer is configured to: i) control each of the plurality of pulse generators to craft a transmitted wave of selected shape in a time domain which produces a selected spectrum in a frequency domain, ii) control each of the plurality of phase shifters to cause radiation emitted from the fractal antenna array to sweep across a coverage radius of at least 5 kilometers, iii) analyze signals received by each of the plurality of fractal antenna arrays to detect electromagnetically reflective objects present in the coverage area of the combined fractal antenna arrays to determine a location and speed of the reflective objects within, and iv) activate the capacitor banks, pulse generators, phase-shifter to transmit a crafted wave via the fractal antenna toward a target which is at least one of the reflective objects detected, wherein the transmitted wave is crafted to disrupt the target so as to annul any threat presented by the target to the area being protected.

In still another aspect, the present disclosure provides a method of providing active defense against incoming threats moving toward a protected vehicle, area, or location. The method comprises a) transmitting, via a fractal antenna array, EM radiation in a range from high frequency (HF) to ultralow frequency (ULF) which is swept across a coverage radius of at least 5 kilometers; b) analyzing signals received by the fractal antenna array, in response to the transmitted radiation, to detect electromagnetically reflective objects present in the coverage area to determine a location and speed of the reflective objects; c) crafting a transmitted wave of selected shape in the time domain which produces a selected spectrum in a frequency domain; and d) transmitting the crafted wave via the fractal antenna toward a target that is at least one of the reflective objects detected, wherein the transmitted wave is crafted to disrupt the target so as to annul any threat presented by the target.

In yet another aspect, the present disclosure provides a fractal-antenna based defense system that comprises a) a fractal antenna array adapted to receive EM radiation in a range from high frequency (HF) to ultralow frequency (ULF); b) a phase shifter coupled to the fractal antenna array; and c) a host computer coupled to the phase shifter and to the fractal antenna array, the host computer configured to analyze signals received by the fractal antenna array and to detect threats within a distance range of at least 5 kilometers based on differential noise in the received signals. Due to the lack of transmitting means in this variant, and due to the case of concealing the fractal antenna, this aspect of the present disclosure can be completely covert.

These and other aspects, features, and advantages can be appreciated from the following description of certain embodiments and the accompanying drawing figures and claims.

BRIEF DESCRIPTION OF THE DRAWINGS

FIG. 2 shows two example elements of a fractal antenna array that can be used in the context of the systems and methods of the present disclosure.

FIG. 3A is a schematic illustration of a DC voltage applied to a conventional transmission line and FIGS. 3B and 3C are schematic drawings of embodiments of shaped transmission line pulse forming networks that can be employed in the systems and method disclosed herein.

DETAILED DESCRIPTION

Figure 1:
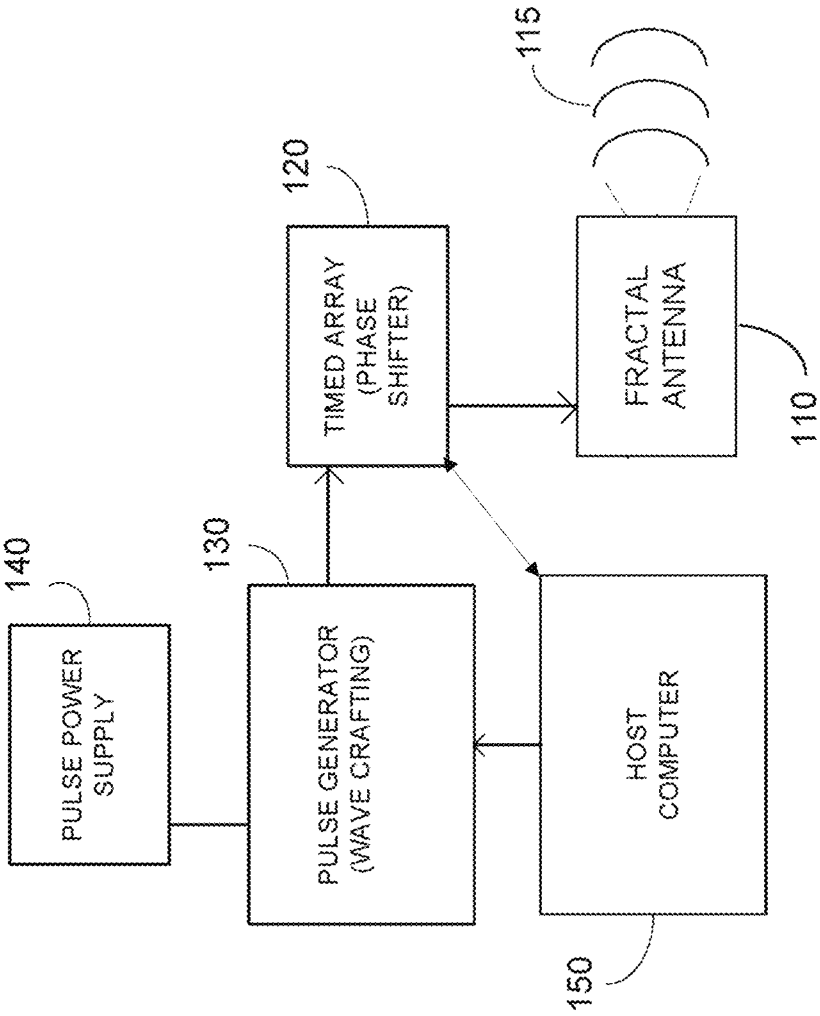
FIG. 1 is a schematic diagram of elements of a generalized system for fractal-based defensive and offensive activities according to an embodiment of the present disclosure.

The system, architecture and methods proposed and presented herein describe a generalized protective system that uses the portion of the electromagnetic spectrum below 30 MHz extending down to the ULF range, to perform various offensive, defensive, and C3ISR (command, control, communications, intelligence, surveillance and reconnaissance) operations. The system and methods employ transmission and reception to address and neutralize wide variety of current and projected scope of threats to armed forces, military and civilian bases, aircraft, ships at sea, submarines, space vehicles, and other assets. Operation in the maritime environment, particularly with regard to underwater threats, requires operation in the VLF portion of the spectrum. The threats can include (but are not limited to) missiles, drones, rockets, and torpedoes. Noted is the fact that the techniques and apparatus described herein can be implemented at other frequencies with similar effect other than transmission through seawater. Operation in the bands below 30 MHz has not been thought to provide a solution due to the large antennae that are generally associated with operations at these frequencies. The use of the fractal antenna resolves this problem by implementation of a VLF antenna of practical size.

It should be recognized that while sub-surface maritime use of the present invention does require operation in the VLF band, for all other applications, (including above-the-surface maritime operation) the frequency of operation is chosen based on specific operational requirements. It is also noted that a ship or submarine can utilize the LF and HF portions of the spectrum if there is an antenna array mounted above the waterline. Maritime operation can have antennae both below and above the waterline for additional versatility in operations.

The problem of undue antenna size of antenna designed to operate at lower frequencies is solved by using a fractal antenna design that has a two-dimensional design that dramatically reduces the required size. Fractal antennas can be positioned on the hull of a surface ship, submarine, plane, or other platform. The systems and method described herein are applicable to vehicular mounting, aircraft mounting, spacecraft mounting, and mounting on surface ships and submarines (both military and civilian).

Notably, the methods for threat neutralization described herein are able to produce RF-induced transparency in the target and can detect and disable, damage or otherwise render useless the internal circuitry of metal-enclosed or conductive-coated objects that would normally behave as a Faraday shield, preventing detection and neutralization under ordinary circumstances.

The Methods described herein rely in part on the differences in propagation between the near-field and the far-field. The near- and far-field describe the electromagnetic phenomena occurring in the regions coincident to an antenna. In the near-field, which is directly adjacent to the antenna, the magnetic field of an emerging wave predominates, while in the far-field, which occurs at the outer edge of the near field zone, it is the electric field that predominates. Further, in the near-field, the rate of energy falloff as a function of distance from the antenna is given by $1/r$ (where "r" is the distance from the antenna in meters), whereas in the far field, the energy falloff is given by $1/r^2$ (the inverse square law). In the frequency ranges that this system is designed to operate at, the near-field generally covers the entire useful target detection and neutralization range.

FIG. 1 is a block diagram showing components of a system for fractal-based defense according to an embodiment of the present disclosure. The components include a fractal antenna 110, embodiments of which are described in detail the '281 patent, incorporated by reference herein. For the purposes of VLF transmission and reception, a fractal antenna essentially enables the conversion of a conventional VLF antenna of extremely large dimensions (e.g., 80 ft or larger, sometimes much larger, even miles in length) into a compact two-dimensional antenna that can be mounted on various vehicles and installations.

Reference is made to FIG. 2 which depicts an exemplary fractal antenna array with two elements. It should be understood two elements are shown for purposes of illustration and that fractal antenna array typically include more than two elements for optimal coverage, such as four, five, six elements, etc. The depicted antenna array 200 includes electrically-isolated elements 205, 210 which can be individually activated so as to provide for beamforming and beam steering as described in the '281 patent by coupling the fractal antenna 110 to a phase shifting circuit 120 shown in FIG. 1. Switching is incorporated into the phase shift circuit 120 to provide a plurality of phase shifted signals, which, when combined interferometrically in the RF output of the antenna, cause the beam to steer in one direction or another or to have multiple beams converge on a single target to deliver added energy to effect neutralization of said target. Some installations may require more than four elements in the antenna in order to form the desired beams.

The phase shifting circuit 120 is coupled to a pulse generator 130 that enables the shape of the pulse waveform to be transmitted by the antenna to be crafted, in the time domain, according to specific requirements; in particular, crafting of the wave enables RF-induced transparency for target detection and neutralization. The pulse generator 130 is a key component of the transmitter sub-system. The pulse generator has a circuit topology that allows the generation of pulses of suitable short risetime of less than one nanosecond, a pulse width (FWHM) equal to or less than 200 nanoseconds, and a pulse repetition rate that can be varied based on the specific target that is being engaged). The pulse generator 130 includes a pulse forming network (PFN) that generates the desired pulse. While pulse forming networks can be formed using networks of capacitors and inductors in various configurations as is known in the art, preferably, a shaped-transmission line PFN is employed.

FIG. 3A is a schematic illustration of a DC voltage pulse applied to a conventional transmission line and FIGS. 3B and 3C are schematic drawings of embodiments of shaped transmission line pulse forming networks that can be employed in the systems and method disclosed herein. In FIG. 3A, a DC signal 302 is applied to a transmission line 305 and comes out with the same shape as entered the (RF) transmission line. In contrast, in FIG. 3B, a transmission line 310 is modified to include a "sidearm" 315. Some of the input signal travels up the sidearm and then is reflected by the open circuit the sidearm represents. The reflected signal then returns to the main portion of the transmission line conductor and is added to the main portion of said signal. The time that this takes is governed generally by the speed of light and the sidearm reflection thereby creates a delay line effect and adds pulse details to the signal being generated. The resulting output signal 320 is shown to the above right of the transmission line. In FIG. 3C, the transmission line 330 includes two sidearms 332, 334. The multiple sidearms 332, 334 have the effect of creating and adding a double pulse 335 as shown. Additional sidearms can be used to create more complex crafted waves.

Figure 4:
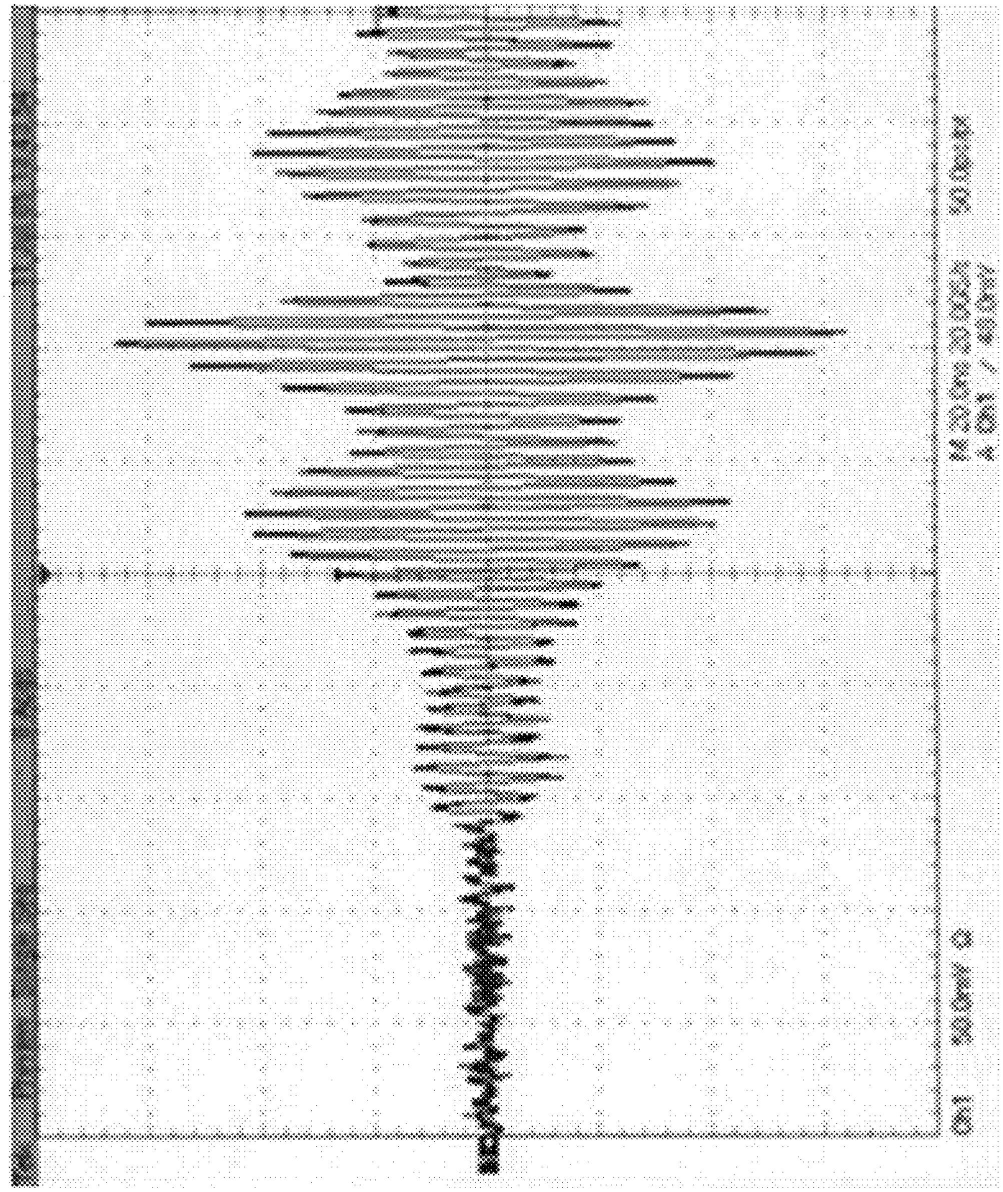
FIG. 4 shows an example of a crafted waveform in the time domain.

Returning to FIG. 1, the pulse generator 130 can employ one or more of such pulse forming networks to generate pulses having the required characteristics in terms of rise time, pulse width and pulse repetition rate (time domain). An example of a crafted waveform in the time domain is shown in FIG. 4. As can be discerned, in the time domain, the pulse includes multiple peaks and troughs with rapid rise and fall times. Importantly, when translated to the frequency domain, the sharp pulses in the time domain have a broad-spectrum, encompassing a number of frequencies at the lower end of the RF spectrum.

Returning again to FIG. 1, the pulse generator 130 is coupled to or incorporates a pulse power supply 140 that uses high power broadband pulse transmission and advanced pulse power techniques. The use of advanced pulse power designs, as known to persons of ordinary skill in the art, enables compact high-power transmitters to be used, avoiding the need for large tuned circuits. The pulse power supply 140 can include a capacitor bank having one or more capacitors, typically wired in parallel to increase their capacitance and which serves as the energy store from which pulses are generated. Parasitic inductances and capacitances must be minimized to maximize the speed at which the energy can be transferred through the circuit but can be used as part of the pulse forming process.

A host computer 150 is coupled to all of the other electronic components 120, 130, and 140 of the system. The host computer 150 provides a variety of functions to the system including operator interfacing (including display and receiver output), generation of control signals for the phase shifter, receiver functions, as well as monitoring and control of system functions and conditions. The host computer 150 is configured to interface and coordinate with other computers and other devices in the relevant network. The host computer 150 can also be part of a portable, backpack configuration coupled to the fractal antenna 110 that can be conveniently folded or rolled.

Data in all versions of the present disclosure is presented to the operator via a waterfall type display as is commonly used in sonar systems. This type of display uses a time-frequency analytical method to display the resulting data from the receiver. In a waterfall display, the X-axis shows the time domain while the Y-axis shows the frequency domain. If there is just a constant (RF) noise background, this appears in the frequency domain as a horizontal line. If there is a perturbation in the noise, this is displayed by a peak in the frequency domain corresponding to the moment in time when said signal was detected. As the display continues to write successive lines of data, the peak is seen to shift position as a function of its speed. When the operator views the multiple lines in the display, the course and speed of the target signal becomes visually apparent. FIG. 6B shows a typical waterfall display image. It is noted that other display methodologies are supported by the present disclosure.

RF-Induced Transparency

Electromagnetically-induced transparency (EIT) is classically considered a coherent optical nonlinearity which briefly renders a medium transparent within a narrow spectral range around an absorption line. It belongs to a class of quantum processes that include Electromagnetically-induced Transparency, Quantum hole-burning, RF-induced Transparency, etc. Hole-burning is a spectroscopy technique which exists when selecting a class of molecules, complexes, or ions in an inhomogeneous line by saturating their absorption using a strong pump field. A second tunable weak beam (probe) makes it possible to measure the spectrum of the selected class.

EIT is, in essence, a quantum process that permits the propagation of light (a form of electromagnetic radiation) through an otherwise opaque atomic medium. RF-induced Transparency (RFIT) is a subset of EIT and while it bears some similarities, it is not an interchangeable term. It is noted that with an understanding of the existence of RFIT, the term EIT is no longer technically accurate as in virtually all cases it is used to refer to events occurring in the optical portion of the spectrum. Accordingly, EIT should more properly be referred to as Optically-induced transparency. It is further noted that RF has been used in to create a state of transparency in the optical portion of the spectrum. The present disclosure represents, to the best knowledge of the author of the present disclosure, the first application of RFIT.

Electromagnetically-induced Transparency (EIT) is associated with a three-level system where the spectral position of EIT window can be changed by varying the frequency of the coupling field. At large detuning, the EIT will evolve into a dispersion-like feature and the transparency property of EIT become less obvious. It is known that the spectral position of EIT window is determined by the frequency detuning of the coupling field. When the frequency detuning of the coupling field is half of the RF Rabi frequency, the EIT feature remains its absorptive profile. The frequency tuning range of EIT is determined by the RF Rabi frequency and can be explained using a dressed-state analysis. Therefore, frequency tuning range of EIT can be controlled by the RF Rabi frequency. In the RFIT system, the equivalent change in the position of the spectral window is achieved by adjusting the time domain parameters of the crafted wave pulse(s) as disclosed in the present invention.

Figure 5A:
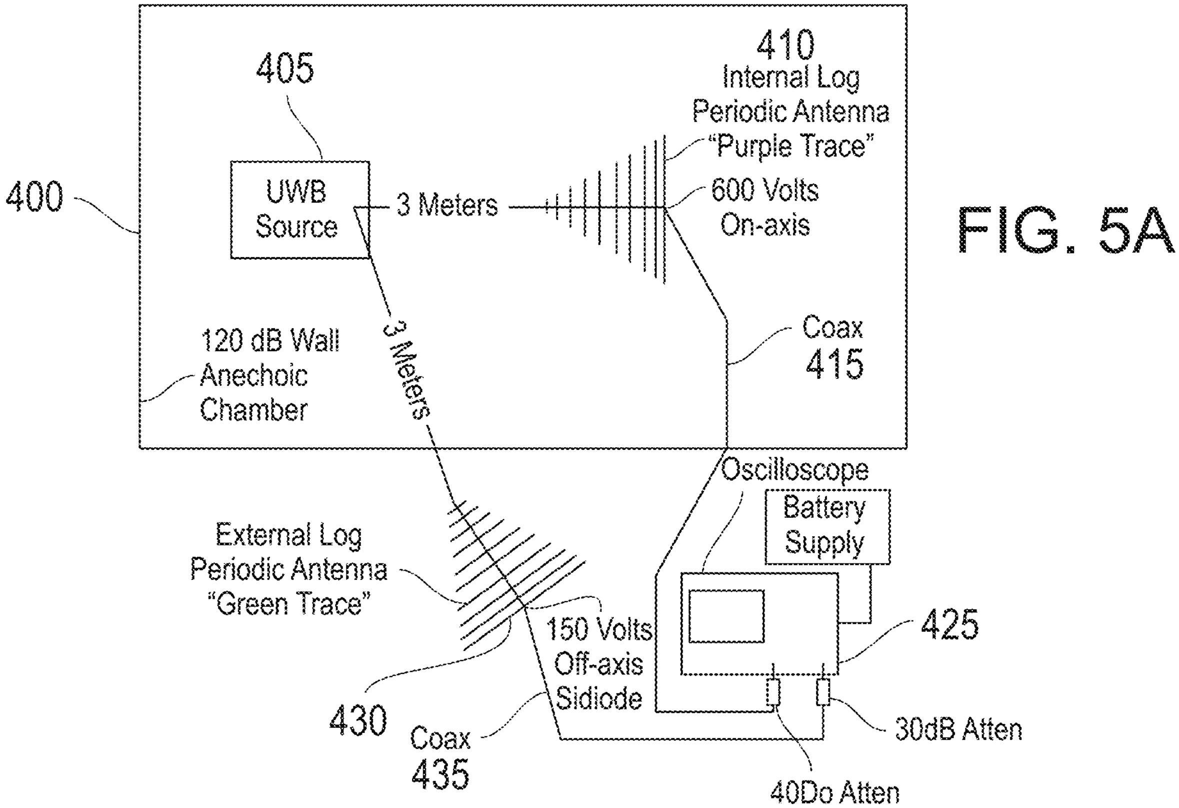
FIG. 5A is a schematic illustration of an experimental demonstration of an EM wave being detected through Faraday shielding.

RF-induced transparency (RFIT) provides a means of overcoming Faraday shielding in the target when the system is used in an active defensive or offensive mode. RFIT signals are characterized by being of extremely short pulse width and extremely fast pulse risetime. FIG. 5A is a schematic illustration of the original experimental demonstration (by the author of the present disclosure) of an EM wave being transmitted through and then detected outside Faraday shielding. In FIG. 5A, there is an RF anechoic chamber 400 that is securely enclosed in conductive metal shielding that is fully bonded to all adjacent shields along all edges and fully bonded to the door (when closed). The chamber 400 is a standard RF anechoic chamber, which is lined with microwave absorbing foam pyramids, which was calibrated immediately prior to the experiment discussed herein, and which has a known wall attenuation of over 80 dB.

An ultrawide-band (UWB) EM radiation source 405 is positioned inside of the chamber. In the demonstration, the UWB source 405 emits a short pulse of radiation which covers a wide band of frequencies including the VLF band. An internal antenna 410 (solid line) positioned within the chamber receives the radiation emitted from the UWB source. As shown in the example, which is actual experimental data from the original RFIT demonstration, the radiation is able to generate a considerable voltage (approximately 600 volts) at the antenna output terminal 412. The voltage on the antenna is transmitted through a coaxial cable 415 via a feedthrough to a terminal of an oscilloscope 425. In the example, the signal from the coaxial cable is attenuated by 40 dB before reaching the oscilloscope 425. It is noted that the oscilloscope is battery-operated to avoid interfering signals from ground interfering with the data. It is further noted that it is necessary to reduce the voltage of the signal coming from the antennae to prevent damaging the oscilloscope. Typically, a scope can only handle signals of 10 volts or less without the use of external attenuators.

The above-described features of the demonstration are conventional. What is very unconventional is that a second, external antenna 430 positioned outside of the chamber 400 nearly simultaneously receives the radiation generated by the UWB source 405. In the demonstration, 150 volts was generated at the output terminal of the antenna 430 by the radiation received from the UWB source 405. The UWB radiation is detected through the Faraday shielding of the chamber, which is unexpected. The signal generated at the output terminal of the antenna 430 is transmitted through a second coaxial cable 435 to a second terminal of the oscilloscope. The signal generated at the output terminal of the antenna 430 is attenuated by 35 dB before it reaches the second terminal.

Figure 5B:
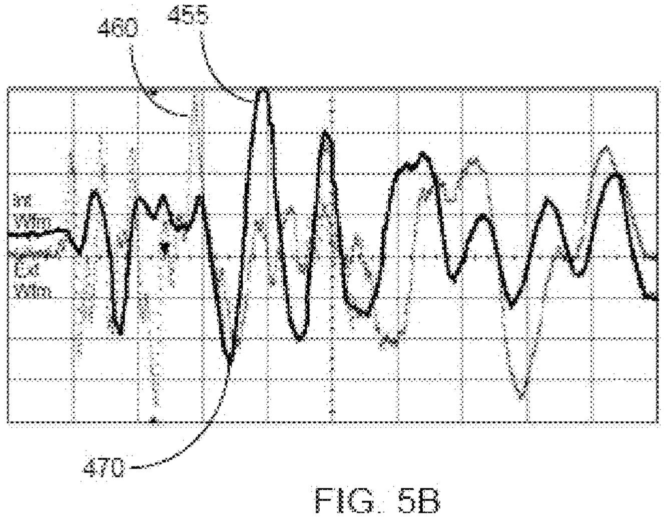
FIG. 5B is a graph showing first and second signals generated on the oscilloscope shown in FIG. 5A representing the time-domain signal received at the first terminal (internal antenna) and the time-domain signal received on the at the second terminal of the oscilloscope.

FIG. 5B shows the actual oscilloscope data from the experiment, the first signal being shown as a solid line, and the second signal being shown by a dotted line generated on the oscilloscope, representing the time-domain signal 455 received at the first terminal (internal antenna) and the time-domain signal 460 received on the at the second terminal of the oscilloscope 425. While there are differences between signals 455, 460, the timing of the signals largely confirms that there is a noted shape confirmation when both signals decline sharply at point 470. In the later part of the graph, signal 460 experiences a delay in comparison to signal 455. However, when the attenuation of high frequencies by the absorbing elements of the chamber are taken into account, i.e., signal 460 lacks certain high-frequency components in comparison to signal 455, Fourier analysis reveals there is a large correspondence between signals 455, 460. This demonstrates that low frequency radiation penetrates the Faraday shielding of chamber 400.

Fuselage Resonance for Offensive Systems

Many of the targets such as missiles, torpedoes, and other aerial and sub-surface vehicles, have the main body of the fuselage generally shaped in an elongated cylindrical manner. The relevance of target objects that are shaped in this manner is that it favorably impacts offensive operations against the target via electronic interference by allowing exploitation of the target using the RFIT and Fuselage Resonance effects. In general, the outer skin of the targets is composed most frequently of metal or some other continuous conductor. By itself, the outer skin offers some amount of Faraday shielding. If the outer skin is non-conductive (comparatively rare), then the inside of the target is unshielded by definition.

In most target designs, there are bulkheads or frames spaced along the interior side of the outer skin. The purpose of these is to hold the outer skin in a particular physical shape (typically generally cylindrical), and also to provide locations to mount internal components. The combination of these structures unintentionally comprises a cylindrical RF cavity having particular electromagnetic properties. Cavities of this type have a resonant frequency, which can be modeled mathematically based on the dimensions and materials of the target. Even if the structure is of a non-uniform shape, it will be appreciated by those of ordinary skill in the art that generally any shape structure will be associated with one or more resonant frequencies depending on the specific shape, although their modeling is more difficult and may require additional computing power or time than is required for simpler designs.

When an electromagnetic field is incident on such a cavity, several different effects occur. First, if the incident field has an appropriate pulse shape (as crafted for RF-induced transparency as discussed above), a significant portion of said field will penetrate the outer shield. Once through the shield, the portion of the field that is resonant with the cavity will oscillate back and forth in the cavity, repeatedly exposing the electronics to an electric field environment that is known to cause various forms of disruption and in some cases damage to the circuitry within the structure. This is one offensive engagement means of the offensive systems of the present disclosure. The bulk of the balance of the energy is reflected off the outer skin and some portion of that is picked up by the antenna and receiver portion of the system and can be processed to produce a “radar-like” range-finding result and also to provide cueing to other portions of the system (e.g., directing the phase shifting network to point a beam or beams at a given target, controlling external offensive and defensive systems, or providing intelligence information for determining one or more characteristics of the target.

An additional effect occurs at the outer skin. When an EM wave is incident to and hits the skin of the target on the outside, a “mirror image” of the wave forms on the inside of the skin within the target. This is similar to the known evanescent wave phenomena found in typically fiber optics. The energy of this mirror image wave interacts with the portion of the original incident field which is oscillating in resonance within the cavity and interferometrically interacts with the resonant waves. The interference can be constructive whereby the energy of the mirror image adds some or all of its energy to the resonant wave energy. This increases the likelihood of interference, disruption, or damage to the internal electronics in the target. It offers useful information for developing the shape of the wave to be crafted.

It is noted that the resonant frequencies referred to here need not be fundamental frequencies, but can also be sub-harmonics, or harmonics higher than the natural resonance frequency although that is less likely as the above-described systems of the present disclosure operate at frequencies well below the natural resonance frequencies of any likely target.

Specific Embodiments

Passive Surveillance (L1 System)

An interesting variant of the present disclosure is a receive-only version specifically optimized for covert intelligence operations. It is discussed here first as it is the simplest manifestation of the present disclosure but not the preferred embodiment which would be described by either the L2 or L3 systems described below. The L1 version is implemented by removing (or not incorporating) the transmitter components such as the pulse generator, capacitor bank and adjusting the configuration of the host computer to accommodate these configuration changes. The aforementioned accommodation consists of removing unnecessary software and hardware associated with the control of the transmitter, and the addition of specialized hardware such as ultra-low noise amplifiers for the front-end of the receiver (with reference to the systems described in L2, L3, and L4).

Figure 6A:
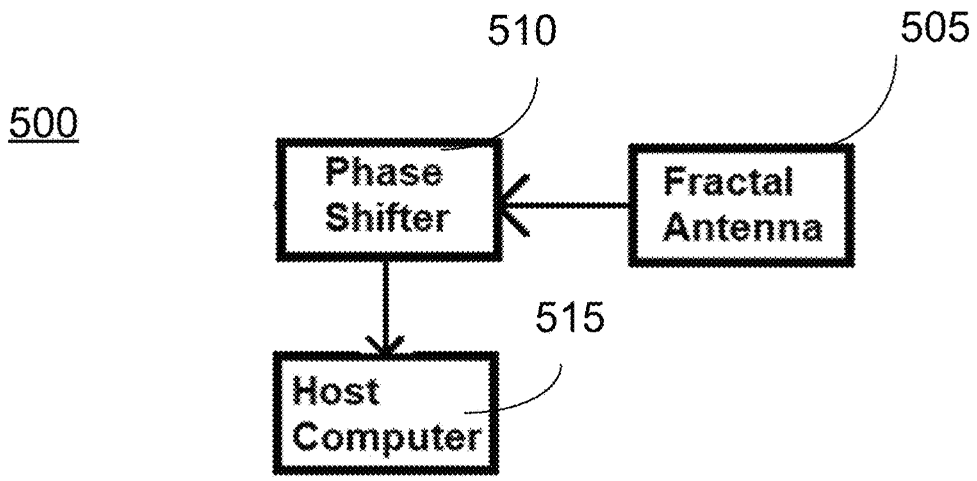
FIG. 6A is a schematic diagram of an embodiment of the present disclosure adapted for passive surveillance ("L1 system").
Figure 6B:
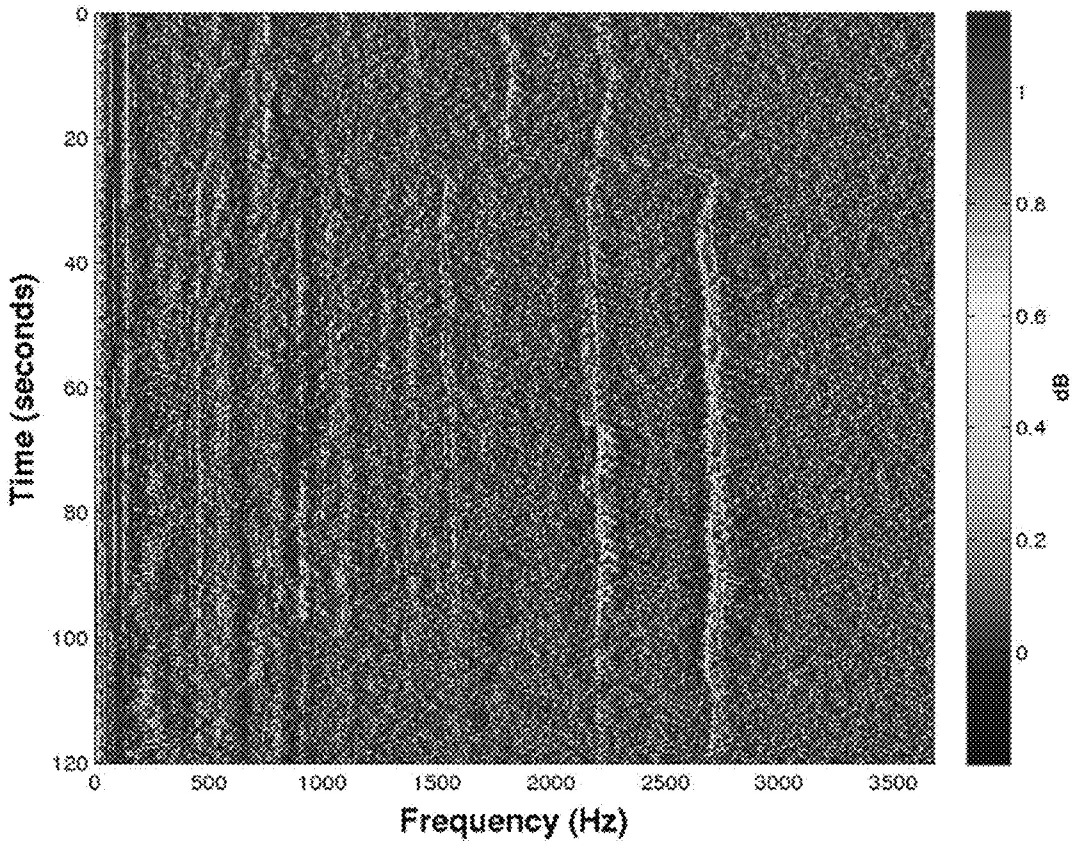
FIG. 6B shows a waterfall-type plot as example output from the receivers of the systems (L1-L5) described herein.

An L1 passive surveillance system 500 is shown in FIG. 6A. The system 500 includes solely a fractal antenna 505, a phase shifter 510 coupled bidirectionally to the antenna, and a host computer 515 coupled bidirectionally to the phase shifter. The host computer 515 is configured to digitize, record, and analyze signals received by the fractal antenna 505 and modified by the phase shifter 510. The system 500 is configured without a transmitter (or with the transmitter locked-out if there if equipped with a transmitter). This system is capable of detecting sources emitting within its spectral coverage range and providing operational cues to other systems. One of the advantages of this system is that it can be totally covert, since the fractal antenna 505, being of thin flat construction, is easily camouflaged. This embodiment, being passive in nature with no emitted signals, is intended primarily for intelligence and SIGINT purposes.

Notably, even though the system is receive-only, it can detect incoming threats that are not ostensibly emitting any electromagnetic signals and are practicing "EMCON" (military term for "Emissions Control"), in a fashion similar to passive sonar. This is because the targets create perturbations in the RF background noise field which the host computer 515 can detect using time and frequency domain techniques. The resulting data can be displayed on a "waterfall" type display as commonly used to interpret sonar signals. FIG. 6B shows a representative "waterfall"-type display. The track of the target is shown as a perturbation in each successive line in the image, which is a plot of time domain versus frequency domain. When the lines are viewed as a continuous time-varying image, the apparent track of the target is easily discerned as is clearly shown in FIG. 6B.

It is noted that all variants use various well known time domain and frequency domain analytical techniques as is apparent to a person of ordinary skill in the art.

Additionally, the L1 system is a reduced function variant and does not utilize several of the components and processes disclosed herein. L1 does not utilize RFIT, EIT, or fuselage resonance. It only uses the fractal antenna, phase shifter, host computer, and waterfall display. It determines the presence of target object by analysis of perturbations in the ambient RF noise field as shown in FIG. 6B and described above.

The embodiment of system 500 or 600 can be man-portable in a container or backpack that contains all items required for system operation including batteries and the antenna which can be rolled or folded for portability. The system 500 can be incorporated into higher level networks.

Active Radar-like Detection and Communication (L2 System)

Figure 7:
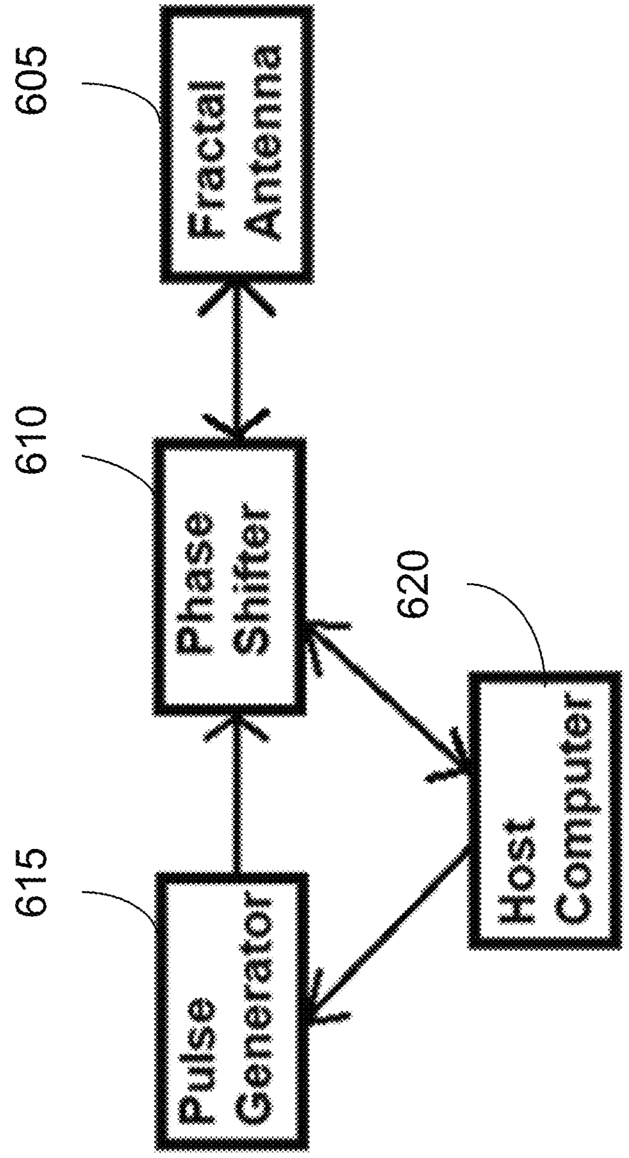
FIG. 7 is a schematic illustration of another embodiment according to the present disclosure which is a system that is configured for radar-like detection and communication ("L2 system").

FIG. 7 is a schematic illustration of another embodiment which is a system that is configured for radar-like detection and communication. The system 600 includes a fractal antenna 605, a phase shifter 610 coupled to the fractal antenna, a pulse generator 615 coupled to the phase shifter 610, and a host computer 620 coupled to the pulse generator and phase shifter.

This embodiment includes both transmitter and receiver. The pulse generator 615 and phase shifter 610 can activate the fractal antenna 605 to transmit radiation. The system 600 is operated like a radar system in that one or more beam(s) can be transmitted and swept across a coverage area to detect whether there are any electromagnetically reflective objects present. Any detection information can be presented by the host computer 620 to an operator in actionable format. The L2 configuration is the basic system implementation. In some embodiments, the system is operative to provide protection against potential threats within as little as 5 kilometers due to the automatic detection and response provided by the system, which can react within miliseconds to detected threats.

In some circumstances, it is desirable to maintain a degree of portability for system 600, the transmitter is preferably relatively low power and intended for ranging and communications. The range is limited by the size of the capacitors in the pulse generator and the size of the prime power supply (not shown).

It is noted that the L2 system (and the additional embodiments L3-L5 described below) has all of the sonar-like detection capabilities of the L1 system and can also output resulting data on a "waterfall" type display. It is further noted that systems L2 through L5 may also have secondary simultaneous displays of other aspects of the detected signals.

The embodiment of system 600 can be man-portable in a container that contains all items required for system operation including batteries and the antenna which can be rolled or folded for portability. The system 600 can be incorporated into higher level networks.

Active Defensive System (L3 System)

Figure 8:
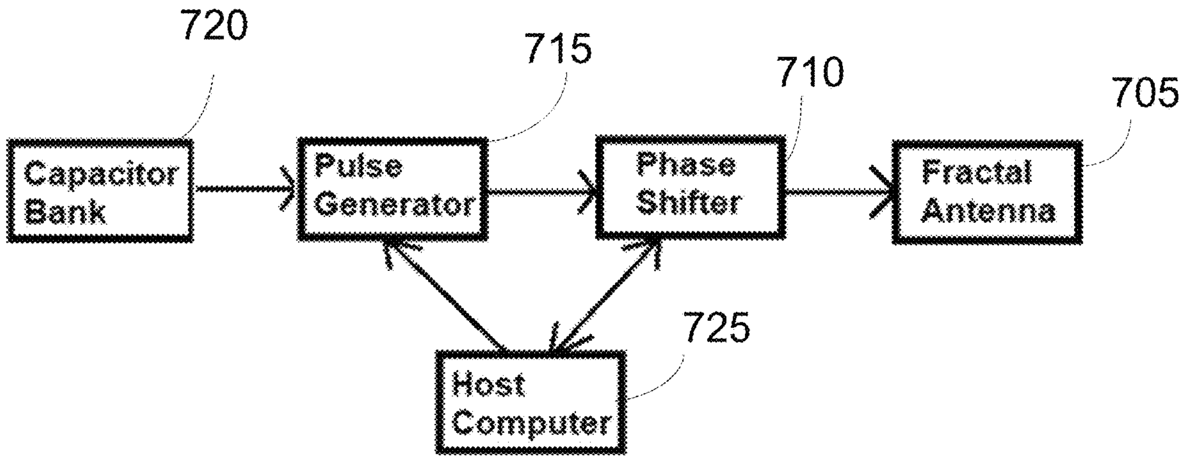
FIG. 8 is a schematic illustration of another embodiment according to the present disclosure which is an active offensive system that can be configured defensive engagement with one or more targets simultaneously ("L3 system").

FIG. 8 is a schematic illustration of another embodiment which is an active offensive system that can be configured defensive engagement with one or more targets simultaneously. The full defensive system 700 includes a fractal antenna 705, phase shifter 710 coupled to the fractal antenna, pulse generator 715 coupled to the phase shifter 710. In this embodiment a capacitor bank 720 is coupled to the pulse generator and a host computer 725 is coupled to the pulse generator 715 and phase shifter 710.

With the addition of the capacitor bank 720, system 700 then has a larger transmitter than the L2 system described above. The larger transmitter enables defensive engagement with one or more targets simultaneously and at distances of approximately 5 to 50 kilometers from the transmitter (protected entity). The capacitor bank 720 that couples to the pulse generator 715 enables higher energy pulses to be generated and higher pulse repetition rates to be generated. A larger prime power supply (not shown) is employed for this purpose. The 3 to 50 Km range is a preferred engagement range, but the engagement range is controllable by an operator by modification of parameters including the size of the capacitor bank 720 and settings on the prime power supply and phase shifter. These parameters can also be adjusted based on the relative hardness of the target (i.e. how well shielded or the type of shielding of the target against electromagnetic interference.) In this embodiment, RFIT and crafted wave technologies therefore become a factor with the aim of overcoming relatively hard targets. It is noted that in this specific configuration, the capacitor bank 729 is smaller than the capacitor bank 820 in the L4 Offensive variant of the present disclosure. This is a major discriminant between the L3 and L4 systems.

Full Offensive System (L4 System)

Figure 9:
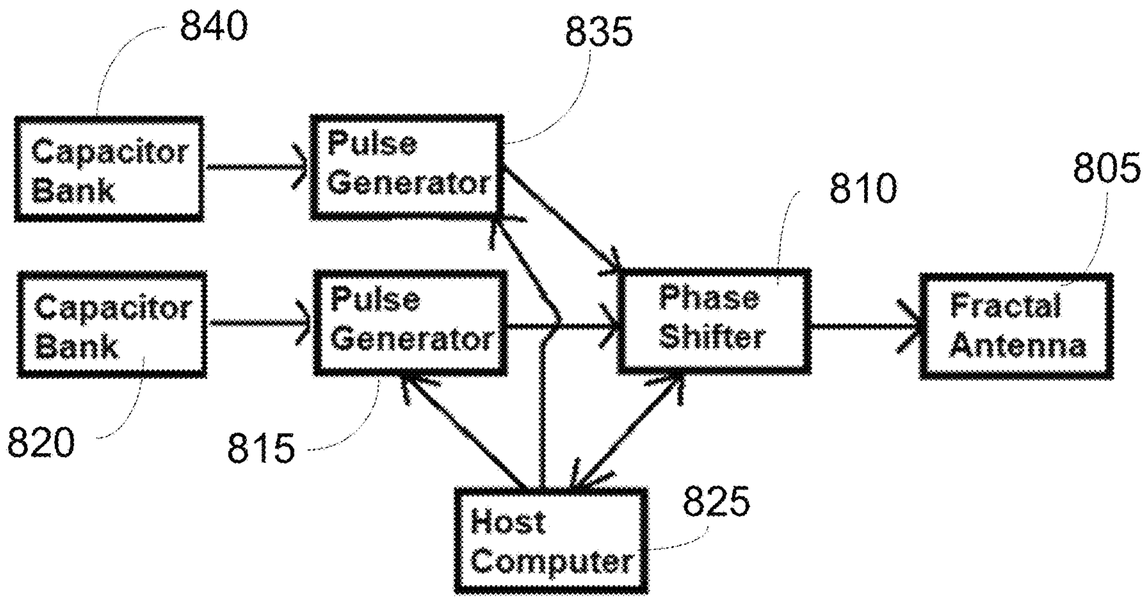
FIG. 9 is a schematic illustration of a full offensive system embodiment according to the present disclosure ("L4 system").

The full offensive system 800 shown in FIG. 9 is similar to the active defensive system 700 (L4 system) in having an antenna 805, phase shifter 810, pulse generator 815, capacitor bank 820 and host computer 825 (and corresponding software). However, in the depicted embodiment, system 800 also includes an additional pulse generator 835 and capacitor 840, which provides a larger, more powerful and more capable transmitter. Due to the greater size, power, range, and capabilities of the transmitter of system 800 can engage multiple targets. The additional capacitor bank and pulse generator allows multiple beams to be radiated simultaneously and also allows beams to be interferometrically "stacked" on a designated target in a fashion similar to the known Active Electronically Scanned Array (AESA) radars currently in use. It is noted in other implementations, the system can include additional resources (i.e., additional pulse generators and capacitors) beyond the two sets as shown in FIG. 9.

In sum, system 800 is the largest and most capable "stand alone" configuration. Additional capacitor storage and additional coordinated pulse generation techniques increase the range, penetrating capability, and number of multiple targets that can be engaged at one time.

Area Protective System (L5 system)

Figure 10:
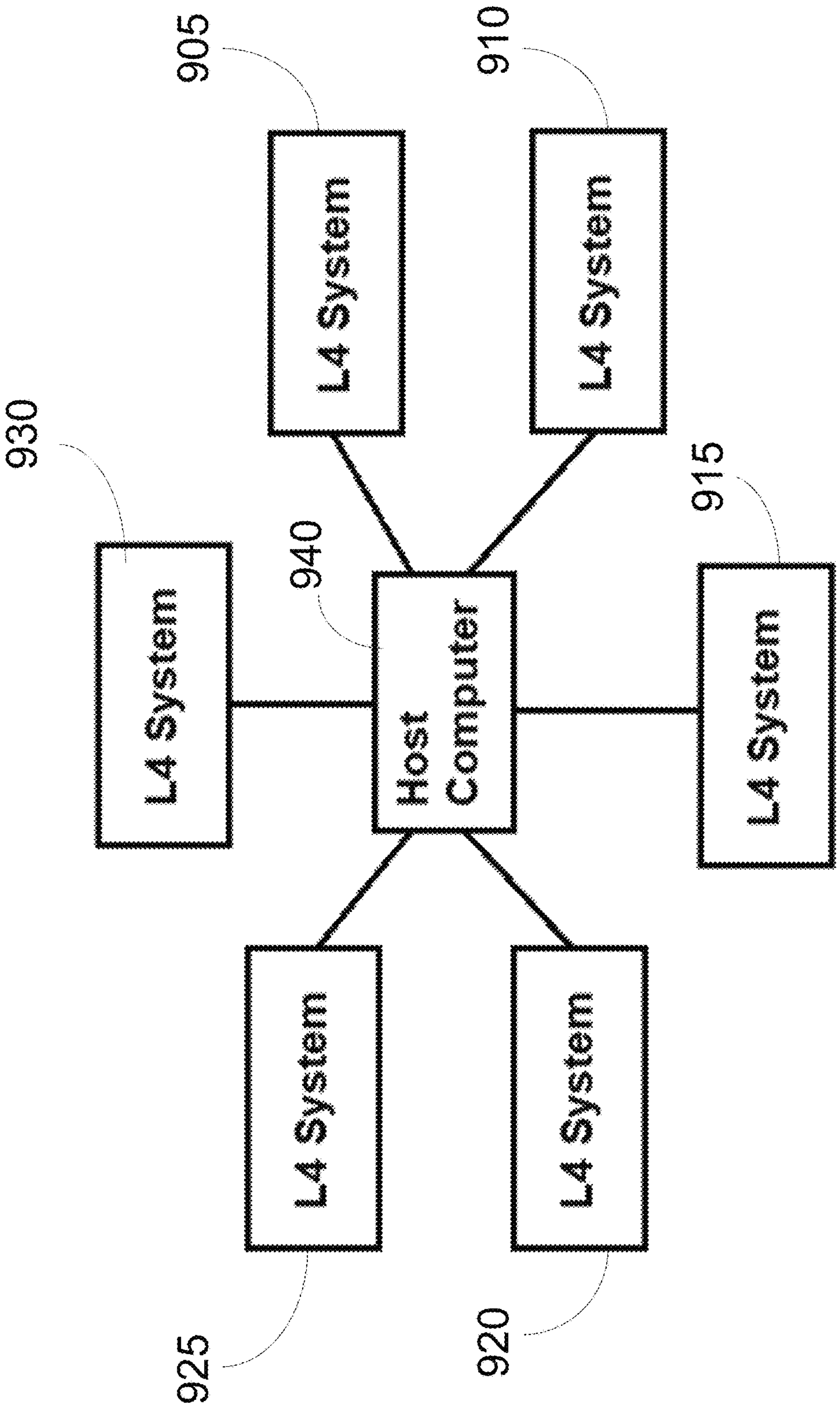
FIG. 10 shows an example embodiment of an area protective system according to the present disclosure ("L5 system").

FIG. 10 shows an example embodiment of an area protective system according to the present disclosure. The area protective system 900 is an expandable multi-site implementation designed to protect large areas, large targets (ships of the line, buildings, bases, etc.) and to have significant multi-target engagement capability. Each site can be considered as a self-contained entity, and preferably, there is an overlap in coverage between the sites to ensure that there are no gaps in coverage. Each site includes an L4 system as described above (and shown in FIG. 9). In the depicted embodiment there are six L4 sites 905, 910, 915, 920, 925, 930 coupled to a host computer 940. If the value of the protected entity (e.g., installation, plant, area) is sufficiently high, the size of the overlaps between sites 905-930 can be decreased so that the loss of a single site does not compromise the functionality of the system. Large overlaps such as this also allow for interferometric beam stacking for active defense and offensive purposes.

Applications

Maritime

Figure 11A:
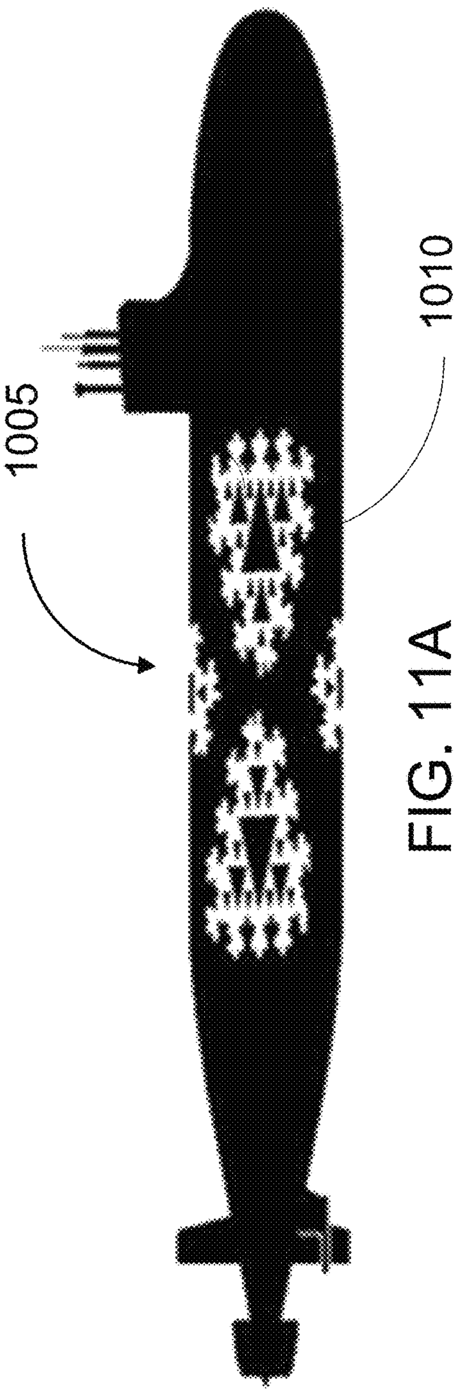
FIG. 11A is an illustration of a submarine having a six-element fractal antenna array and which can utilize one or more of the systems of the present disclosure.

Among the notable applications of the above-described systems is in maritime defense and communication. The only portions of the electromagnetic spectrum that reliably penetrate water (and in particular seawater) are the VLF and ULF bands below 200 KHz. It known to those of skill in the art that these bands can provide reliable, if somewhat low bandwidth, communications to submerged vessels. This feature of VLF communication has been utilized as such by navies for long distance communications of mission-critical information to submarines. As such, virtually all US Navy submarines have antennae in the form of a very long (miles) trailing wire that reliably receives these signals. The long trailing antenna can be disadvantageous for a number of reasons, and presents a limitation as to where and when such antennae can be deployed. However, the use of a compact fractal antenna-based system that can operate in the VLF band can remedy this difficulty. FIG. 11A is an illustration of a submarine 1005 having a six-element fractal antenna array mounted on its surface is an example of one of many possible implementations.

Figure 11B:
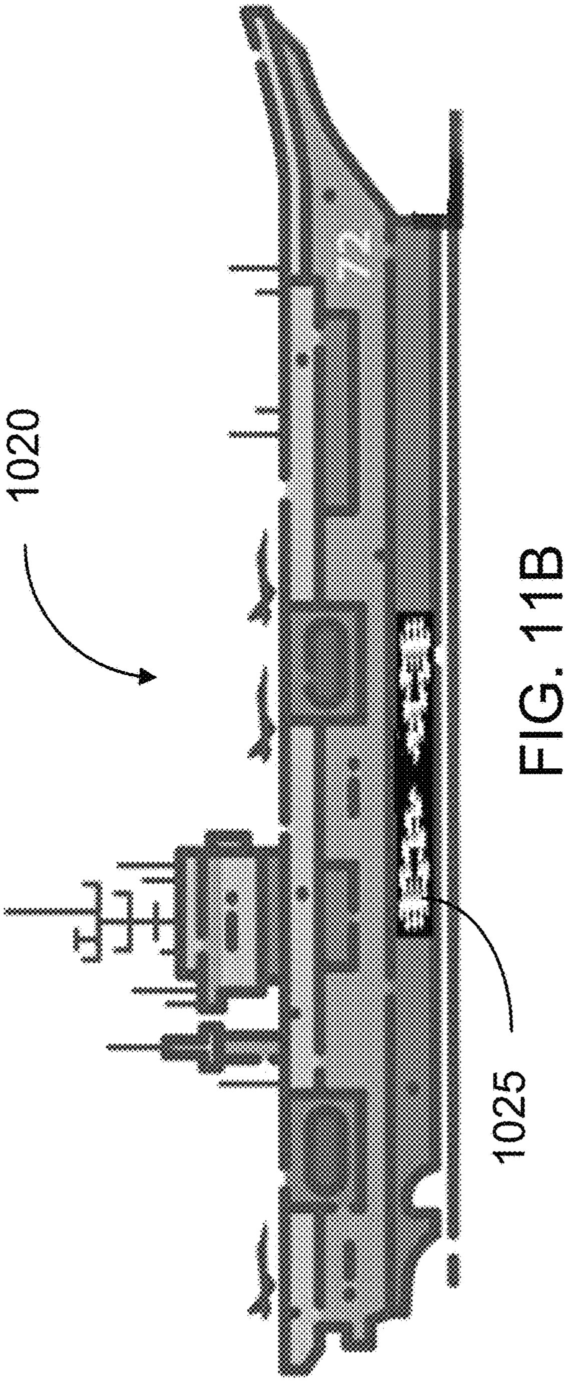
FIG. 11B an illustration of an aircraft carrier having a four-element fractal antenna mounted below the waterline and which can utilize one or more of the systems of the present disclosure.

The maritime applications are not limited to submarines but rather extend to all forms of ships and maritime structures that are large enough to support a suitably sized fractal antenna array and have sufficient power available to run the system. It is noted that the arrays are conformal, so most hull shapes can be accommodated with little or no penalty to the hydrodynamic performance of the vessel. It is noted that system power requirements vary depending on the specific implementation of the system. For example, if the aim is for a detection system (i.e., L1, L2 systems described above), the power requirements are relatively low (dependent on the range desired). If, however, if the aim is for a system with active defensive capabilities or offensive capabilities (i.e., L3, L4 systems described above), then substantially more prime power is needed. As noted, power requirements also depend upon range requirements and target specific considerations. FIG. 11B is an illustration of an aircraft carrier 1120 having a four-element fractal antenna 1125 array mounted below the waterline. The number of elements of the fractal antenna can be increased in certain implementations by adding elements and additional phase shifters, including multiple elements at the bow and stern to increase the resolution and coverage of the system. Additionally, in shipboard installations, a single system with multiple antennae located both above and below the waterline of said ships design can be used to mitigate threats that are both underwater and in the air. As the shipboard configuration is by definition a multi-site system, a multi-mode surveilling system can be implemented by positioning some of the system for surveilling the underwater environment and other portions for surveilling airborne threats. It is noted that most large ships and submarines are big enough to carry multiple arrays which enable more complex beamforming operations to Be carried out and enable more targets to be simultaneously engaged.

It is further noted that in the maritime environment, it is desirable to have the C3ISR functions of the present disclosure available for potential targets both above and below the waterline. This allows development of a $4\pi$ steradian (complete sphere) zone of protection around a maritime platform.

Force and Base Protection

Figure 12:
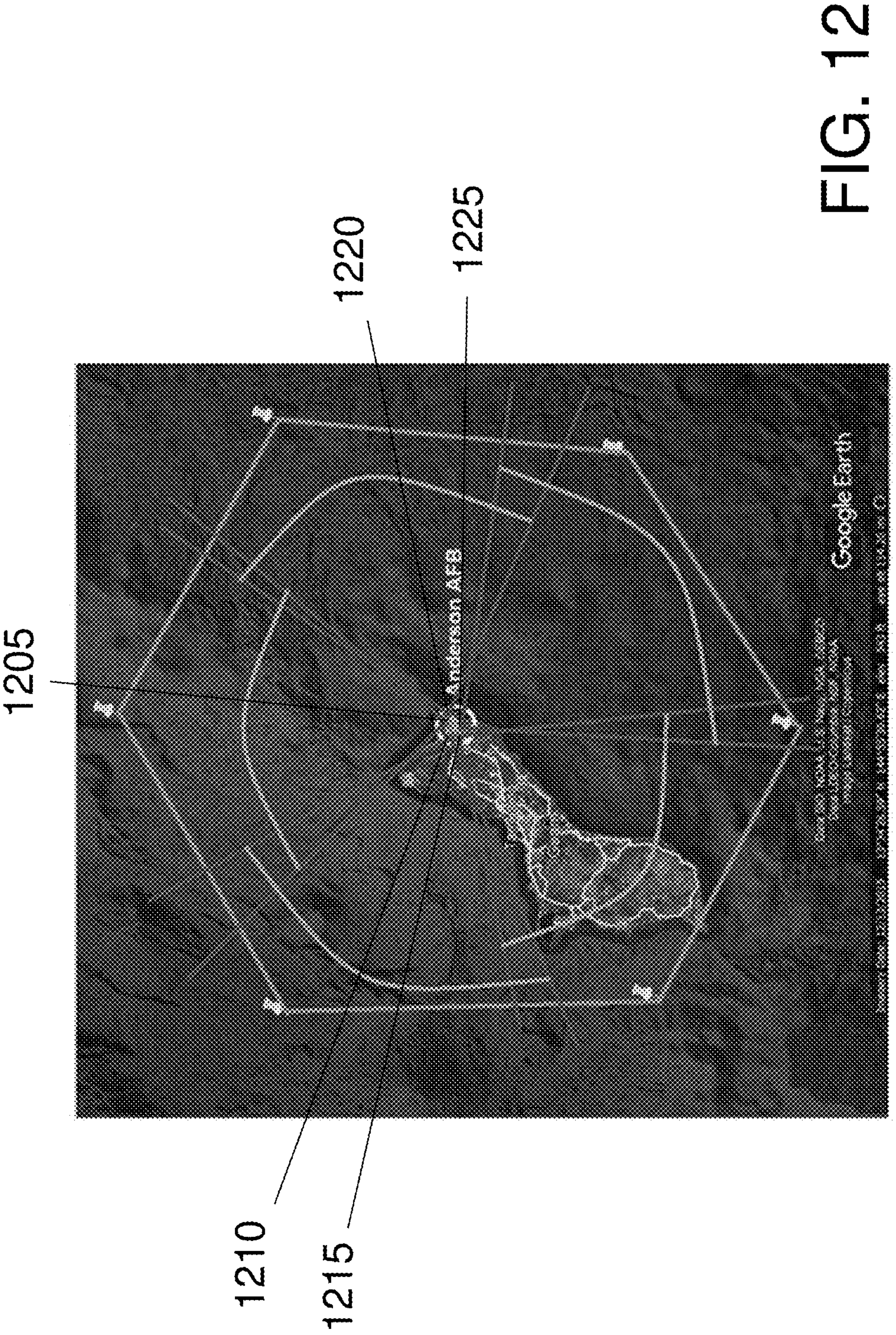
FIG. 12 is a top-down geographical map that illustrates an exemplary defensive system for the protection of an island which has base on it according to the present disclosure.

FIG. 12 is a top-down geographical map that illustrates an exemplary defensive system 1100 for the protection of an island which has an air force base on it (in this example, the island is Guam and the base is Anderson AFB positioned at the northeast end of the island). In system 1100, there are five discrete transmitter sites 1105, 1110, 1115, 1120, 1125, each with a nominal 90-degree coverage. The sites 1105-1125 also have overlaps of the individual beam sectors. This system allows both queueing of incoming targets, defensive responses to neutralize said targets, and long-range communications to other land, sea air, or space-based assets. One of the advantages of this system is that it provides for multiple beams to be brought to bear on a single target in a phase coherent fashion to effect interferometric beam addition (beam stacking) to increase the energy delivered to the target. If higher resolution or increased multi-target capacity is required, additional transmitter sites can be integrated into the system. It is noted that while the sites are referred to as "transmitter sites", each site also has receiving and targeting capability. Initial analysis of such systems indicates that approximately 250 KW of prime power is a suitable amount of power for each transmitter site in such a system. Those of skill in the art will appreciate that the amount of power provided can be modified according to system requirements.

Aerial Applications

Figure 13:
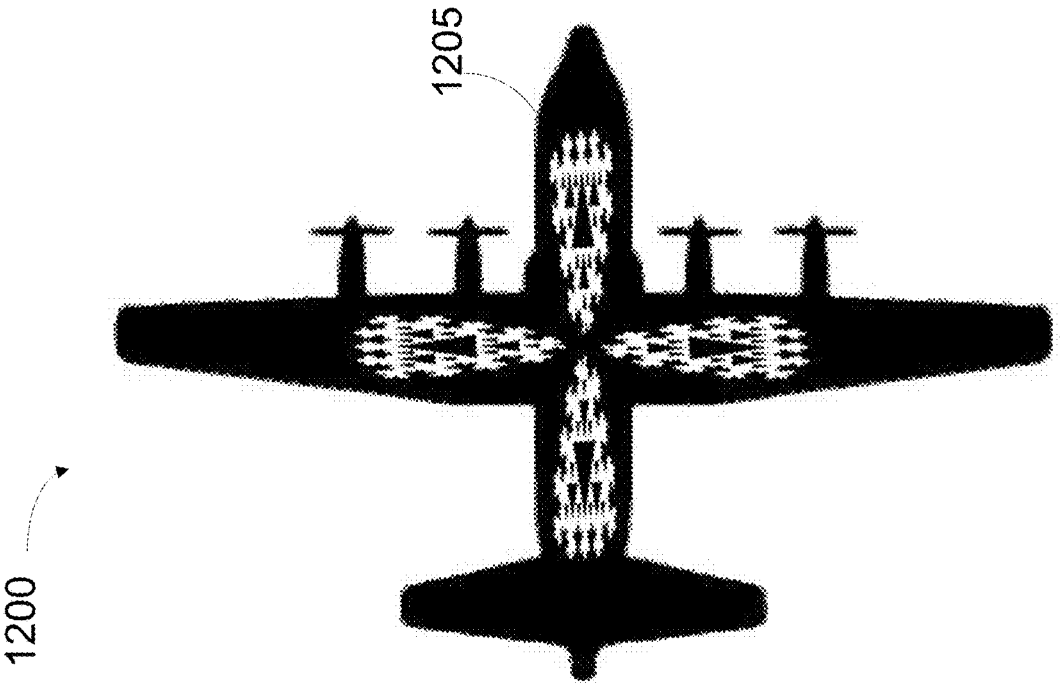
FIG. 13 is an illustration of an aircraft that includes a four-element fractal antenna array mounted on the underside and which can utilize one or more of the systems of the present disclosure.

The systems of the present disclosure can also be installed on aircraft as well as spacecraft. FIG. 13 is an illustration of an aircraft 1200, in this case a C-130 transport plane that includes a four-element fractal antenna array 1205. For example, the aircraft can incorporate a L1 or L2 system used for communications and for signals intelligence applications. In other embodiments, an L3 or L4 system can be incorporated for offensive weapons applications, primarily against shielded underground targets. This is enabled by the high penetration of VLF class signals through the earth and the penetration of shields afforded by the Crafted Wave/RFIT aspect of the system. An example of a space-based application would be integrating one of the L1-LA systems into the solar panels of a satellite or space station. The fractal antenna array can be made using transparent conductors and laminated over the face of solar cell arrays. Additionally or alternatively, the fractal antenna array can be mounted on the backside of the solar arrays, aiding in making the presence of the system installation difficult to detect. Intelligence, defensive and offensive operations are enabled by this technology. The beam steering capability of the fractal antenna-based systems described herein means that the preferred orientation of a space-based platform can be left undisturbed in most instances.

It is to be understood that any structural and functional details disclosed herein are not to be interpreted as limiting the systems and methods, but rather are provided as a representative embodiment or arrangement for teaching one skilled in the art one or more ways to implement the methods.

It is to be further understood that like numerals in the drawings represent like elements through the several figures, and that not all components or steps described and illustrated with reference to the figures are required for all embodiments or arrangements.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the either of the terms "comprises" or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A fractal-antenna based system with radar-like detection and communication for providing offensive, defensive and detection capabilities, comprising:

a) a fractal antenna array adapted to transmit and receive EM radiation in a range from high frequency (HF) to ultralow frequency (ULF);

b) a phase shifter coupled to the fractal antenna array;

c) a pulse generator coupled to the phase shifter; and d) a host computer coupled to the phase shifter and the pulse generator, the host computer being configured to:

i) control the pulse generator to generate a crafted wave of selected shape in a time domain which produces a selected spectrum in a frequency domain, wherein an output energy of the pulse generator is set so as to enable active defensive measures or detection only modes;

ii) control the phase shifter to cause radiation emitted from the fractal antenna array to sweep across a coverage radius of at least 5 kilometers, iii) analyze signals received by the fractal antenna array to detect electromagnetically a location and speed of reflective objects present in the coverage radius, and iv) activate countermeasures based on a location and speed of a detected reflective object, wherein the detected reflective object is determined to be a potential threat.

2. A maritime vessel including the system of claim 1, wherein the fractal antenna array is mounted below a waterline of a vessel to provide offensive, defensive, and detection capabilities against underwater threats.

3. A maritime vessel including the system of claim 1, wherein the fractal antenna array is mounted above a waterline of a vessel to provide offensive, defensive, and detection capabilities against airborne and sea surface-based threats.

4. A maritime vessel including the system of claim 1, wherein a first fractal antenna array is mounted below a waterline of a vessel to provide offensive, defensive, and detection capabilities against underwater threats and a second fractal antenna is mounted above the waterline of a vessel to provide offensive, defensive, and detection capabilities against airborne and sea surface-based threats.

5. An aerial vehicle including the system of claim 1, wherein the fractal antenna array is mounted on a surface of the aerial vehicle.

6. A ground installation including the system of claim 1, wherein the fractal antenna array is positioned at the ground installation.

7. A space-based platform including the system of claim 1, wherein the space-based platform further includes a solar panel and the fractal antenna array is incorporated in the solar panel.

8. A space-based platform including the system of claim 7, wherein the fractal antenna array of the system is mounted on a back side of the solar panel behind photovoltaic elements of the solar panel.

9. The space-based platform of claim 7, wherein the fractal antenna array is made from transparent conductive material and the fractal antenna array is incorporated in a sun-facing part of the solar panel.

10. The space-based platform of claim 7, wherein the fractal antenna array includes first elements that are incorporated on a back side of the solar panel behind photovoltaic elements of the solar panel and second elements that are made from transparent conductive material and incorporated in a sun-facing part of the solar panel.

11. The space-based platform of claim 7, wherein the space-based platform is a space station.

12. The space-based platform of claim 7, wherein the space-based platform is a satellite.

13. The fractal-antenna based system of claim 12, further comprising:

a. at least one additional pulse generator coupled to the phase shifter;

b. at least one additional capacitor bank coupled to the at least one additional pulse generator;

wherein the system is operative to transmit multiple beams simultaneously via the pulse generator and the at least one additional pulse generator as controlled by the host computer.

14. The fractal-antenna based system of claim 13, wherein the host computer is configured to electronically stack a plurality of beams interferometrically on a designated target.

15. The fractal-antenna based system of claim 1, wherein the fractal antenna array is foldable into a portable structure and the host computer is storable in another portable structure that can be coupled to the fractal antenna array.

16. The fractal-antenna based system of claim 1, wherein the fractal antenna array can be rolled into a portable structure and the host computer is storable in a another portable structure that can be coupled to the fractal antenna array.

17. A fractal-antenna based active defensive system communication for providing offensive, defensive and detection capabilities, comprising:

a) a fractal antenna array adapted to transmit and receive EM radiation in a range from high frequency (HF) to ultralow frequency (ULF);
b) a phase shifter coupled to the fractal antenna array;
c) a pulse generator coupled to the phase shifter;
d) a capacitor bank coupled to the pulse generator operative to increase an energy and repetition rate of pulses provided for transmission by the fractal antenna array; and
e) a host computer coupled to the phase shifter and the pulse generator, the host computer being configured to:
   i) control the pulse generator to generate a crafted wave of selected shape in a time domain which produces a selected spectrum in a frequency domain,
   ii) control the phase shifter to cause radiation emitted from the fractal antenna array to sweep across a coverage radius of at least 5 kilometers,
   iii) analyze signals received by the fractal antenna array to detect electromagnetically reflective objects present in the coverage radius to determine a location and speed of the reflective objects, and
   iv) activate the capacitor bank, pulse generator, phase-shifter to transmit the crafted wave via the fractal antenna array toward a target which is at least one of the reflective objects detected, and wherein the transmitted crafted wave is crafted to disrupt the target so as to annul any threat presented by the target.

18. The fractal-antenna based system of claim 17, wherein the transmitted crafted wave is crafted by the host computer and pulse generator in such manner as to briefly create a state of RF-induced transparency in a detected target within a coverage radius.

19. The fractal-antenna based system of claim 18, wherein beam-forming parameters of the phase shifter and a size of the capacitor bank are adjustable based on an estimated hardness of a selected expected target.

20. The fractal-antenna based system of claim 18, wherein the transmitted crafted wave is further crafted in the time domain so as to resonate with fuselage structures of the detected target, the resonating wave causing disturbance to any electrical and electronic components within the detected target.

21. A maritime vessel including the system of claim 18, wherein the fractal antenna array is mounted below a waterline of a vessel to provide offensive, defensive, and detection capabilities against underwater threats.

22. A maritime vessel including the system of claim 17, wherein the fractal antenna array is mounted above a waterline to provide offensive, defensive, and detection capabilities against airborne and sea surface-based threats.

23. A maritime vessel including the system of claim 17, wherein a first fractal antenna array is mounted below a waterline of a vessel to provide offensive, defensive, and detection capabilities against underwater threats and a second fractal antenna is mounted above the waterline of the vessel to provide offensive, defensive, and detection capabilities against airborne and sea surface-based threats.

24. An aerial vehicle including the system of claim 17, wherein the fractal antenna array is mounted on a surface of an aerial vehicle.

25. A ground installation including the system of claim 17, wherein the fractal antenna array is positioned at the ground installation.

26. A space-based platform including the system of claim 17, wherein the space-based platform further includes a solar panel and the fractal antenna array is incorporated in the solar panel.

27. A space-based platform including the system of claim 26, wherein the fractal antenna array is mounted on a back side of the solar panel behind photovoltaic elements of the solar panel.

28. The space-based platform of claim 26, wherein the fractal antenna array is made from transparent conductive material and the fractal antenna array is incorporated in a sun-facing part of the solar panel.

29. The space-based platform of claim 26, wherein the fractal antenna array includes first elements that are incorporated on a back side of the solar panel behind photovoltaic elements of the solar panel and second elements that are made from transparent conductive material and incorporated in a sun-facing part of the solar panel.

30. The space-based platform of claim 26, wherein the space-based platform is a space station.

31. The space-based platform of claim 26, wherein the space-based platform is a satellite.

32. The fractal-antenna based system of claim 17, wherein the fractal antenna array is foldable into a portable structure and the host computer is storable in another portable structure that can be coupled to the fractal antenna array.

33. The fractal-antenna based system of claim 17, wherein the fractal antenna array can be rolled into a portable structure and the host computer is storable in another portable structure that can be coupled to the fractal antenna array.

34. A fractal-antenna based protective system for an area comprising:

a) a plurality of fractal antenna arrays adapted to transmit and receive EM radiation in a range from high frequency (HF) to ultralow frequency (ULF), each of the plurality of fractal antenna arrays positioned at a location within a radius of a central location;
b) a plurality of phase shifters, each of the plurality of phase shifters coupled to one of the plurality of fractal antenna arrays;
c) a plurality of pulse generators, one or more of the plurality of pulse generators being coupled to one of the plurality of phase shifters;
d) a plurality of capacitor banks, each of the plurality of capacitor banks coupled one of the plurality of pulse generators and being operative to increase an energy and repetition rate of pulses provided for transmission by the plurality of fractal antenna arrays; and
e) a single host computer coupled to each of the plurality of pulse generators and phase shifters, the host computer being configured to:
   i) control each of the plurality of pulse generators to generated a crafted wave of selected shape in a time domain which produces a selected spectrum in a frequency domain, ii) control each of the plurality of phase shifters to cause radiation emitted from the plurality of fractal antenna arrays to sweep across a coverage radius of at least 5 kilometers, iii) analyze signals received by each of the plurality of fractal antenna arrays to detect electromagnetically reflective objects present in the coverage radius of the combined plurality of fractal antenna arrays to determine a location and speed of the reflective objects within, and iv) activate the capacitor banks, pulse generators, and phase-shifters to transmit the crafted wave via the plurality of fractal antenna arrays toward a target which is at least one of the reflective objects detected, wherein the transmitted crafted wave is crafted to disrupt the target so as to annul any threat presented by the target to the area.

35. The fractal-antenna based protective system of claim 34, wherein the transmitted crafted wave is crafted by the host computer and at least one of the plurality of pulse generators in such manner as to briefly create a state of RF-induced transparency in a detected target within a coverage radius.

36. The fractal-antenna based protective system of claim 35, wherein beam-forming parameters of the at least one of the plurality of phase shifters and size of at least one of the plurality of capacitor banks are adjustable based on an anticipated hardness of a selected expected target.

37. The fractal-based protective system of claim 36, wherein the transmitted crafted wave is further crafted in the time domain so as to resonate with fuselage structures of the detected target, the resonating wave causing disturbance to any electrical and electronic components within the detected target.

38. A method of providing active defense against incoming threats moving toward a protected vehicle, area, or location, the method comprising:

a) transmitting, via a fractal antenna array, EM radiation in a range from high frequency (HF) to ultralow frequency (ULF) which is swept across a coverage radius of at least 5 kilometers;

b) analyzing signals received by the fractal antenna array, in response to the EM radiation that is transmitted, to detect electromagnetically reflective objects present in the coverage radius to determine a location and speed of the reflective objects;

c) crafting a wave of selected shape in a time domain which produces a selected spectrum in a frequency domain; and d) transmitting the wave of selected shape via the fractal antenna array toward a target that is at least one of the reflective objects detected, wherein the wave is crafted to disrupt the target so as to annul any threat presented by the target.

39. The method of claim 38, wherein crafting step is performed in such manner as to briefly create a state of RF-induced transparency in a detected target when the wave is incident upon the detected target within the coverage radius.

40. The method of claim 39, wherein an energy and shape of the crafted wave are adjustable based on an estimated hardness of an expected target.

41. The method of claim 40, wherein the crafting step is further performed in such manner that wave is further crafted in the frequency domain so as to resonate with fuselage structures of the detected target of the detected target, the resonating wave causing disturbance to any electrical and electronic components within the detect target.

42. The method of claim 38, further comprising mounting the fractal antenna array and related components below a waterline of the vessel to provide offensive, defensive, and detection capabilities against underwater threats.

43. The method of claim 38, further comprising mounting the fractal antenna array and related components above a waterline of the vessel to provide offensive, defensive, and detection capabilities against airborne and sea surface-based threats.

44. The method of claim 38, further comprising:

a) mounting a first fractal antenna array and related components below a waterline of the vessel to provide offensive, defensive, and detection capabilities against underwater threats; and b) mounting a second fractal antenna array and related components above a waterline of the vessel to provide offensive, defensive, and detection capabilities against airborne and sea surface-based threats.

45. The method of claim 38, further comprising mounting the fractal antenna array and related components on a surface of the aerial vehicle.

46. The method of claim 38, further comprising positioning the fractal antenna array and related components at a ground installation.

47. The method of claim 38, further comprising mounting the fractal antenna array and related components on a space-based platform having a solar panel.

48. The method of claim 47, further comprising mounting the fractal antenna array of the system on a back side of the solar panel behind photovoltaic elements of the solar panel.

49. The method of claim 47, further comprising mounting the fractal antenna array on a sun-facing part of the solar panel, wherein the fractal antenna is made from transparent conductive material.

50. The method of claim 47, further comprising:

mounting first fractal antenna array elements on a back side of the solar panel behind photovoltaic elements of the solar panel; and mounting second fractal antenna array elements on a sun-facing part of the solar panel, wherein the second fractal antenna elements are made from transparent conductive material.

51. The method of claim 47, wherein the space-based platform is a space station or a satellite.

52. The method of claim 47, further comprising configuring the fractal antenna array and related components in a portable structure.

53. The method of claim 47, further comprising configuring the fractal antenna array and related components in a portable structure.

54. A fractal-antenna based defense system comprising:

a) A fractal antenna array adapted to receive EM radiation in a range from high frequency (HF) to ultralow frequency (ULF);

b) a phase shifter coupled to the fractal antenna array; and c) a host computer coupled to the phase shifter and to the fractal antenna array, the host computer configured to: analyze signals received by the fractal antenna array and to detect threats within a distance range of at least 5 kilometers based on differential noise in the received signals and to activate countermeasures based on a location and speed of a detected reflective object, wherein the detected reflective object is determined to be a potential threat.

55. A maritime vessel including the system of claim 54, wherein the fractal antenna array is mounted below a waterline of the marine vessel to provide defensive, offensive and detection capabilities against underwater threats.

56. A maritime vessel including the system of claim 54, wherein the fractal antenna array is mounted above a waterline of the marine vessel to provide defensive, offensive and detection capabilities against airborne and sea surface-based threats.

57. A maritime vessel including the system of claim 54, wherein the fractal antenna array include first elements that are mounted above the waterline of the vessel to provide defensive, offensive and detection capabilities against airborne and sea surface-based threats and second elements that are mounted below a waterline of the marine vessel to provide defensive, offensive and detection capabilities against underwater threats.

58. An aerial vehicle including the system of claim 54, wherein the fractal antenna array is mounted on a surface of the aerial vehicle.

59. A ground installation including the system of claim 54, wherein the fractal antenna array is positioned at the ground installation.

60. The fractal-antennal based defense system of claim 54, wherein the fractal antenna array can be folded into a portable structure and the host computer is storable in another portable structure that can be coupled to the fractal antenna array.

61. The fractal-antennal based defense system of claim 54, wherein the fractal antenna array can be rolled into a portable structure and the host computer is storable in another portable structure that can be coupled to the fractal antenna array.

* * * * *